(12) United States Patent
Tong et al.

(10) Patent No.: US 11,097,248 B1
(45) Date of Patent: Aug. 24, 2021

(54) POLYLACTIC ACID DEVOLATILIZATION EVAPORATOR

(71) Applicants: COFCO (jilin) Bio-Chemical Technology CO., Ltd, Changchun (CN); Nutrition & Health Research Institute, COFCO Corporation, Beijing (CN); Jilin COFCO Biomaterial Co., Ltd, Changchun (CN); COFCO BIOTECHNOLOGY CO., LTD., Bengbu (CN)

(72) Inventors: Yi Tong, Beijing (CN); Yi Li, Beijing (CN); Kejia Xu, Beijing (CN); Bo Chen, Beijing (CN); Tai An, Beijing (CN); Fang Tian, Beijing (CN); Zhaoning Cui, Beijing (CN); Lida Wu, Changchun (CN)

(73) Assignees: COFCO (jilin) Bio-Chemical Technology Co., Ltd, Changchun (CN); Nutrition & Health Research Institute, COFCO Corporation, Beijing (CN); Jilin COFCO Biomaterial Co., Ltd, Changchun (CN); COFCO Biotechnology Co., Ltd., Bengbu (CN)

( * ) Notice: Subject to any disclaimer, the term of this patent is extended or adjusted under 35 U.S.C. 154(b) by 0 days.

(21) Appl. No.: 17/137,021

(22) Filed: Dec. 29, 2020

(30) Foreign Application Priority Data

Apr. 29, 2020 (CN) .......................... 202010358359.1

(51) Int. Cl.
*B01J 19/20* (2006.01)
*B01D 1/30* (2006.01)
(Continued)

(52) U.S. Cl.
CPC ............ *B01J 19/20* (2013.01); *B01D 1/0041* (2013.01); *B01D 1/30* (2013.01); *C08G 63/08* (2013.01)

(58) Field of Classification Search
CPC .......... B01J 19/20; B01D 1/0041; B01D 1/30; C08G 63/08
See application file for complete search history.

(56) References Cited

U.S. PATENT DOCUMENTS 3,067,812 A * 12/1962 Latinen .................. B29C 48/76
159/6.2
3,477,491 A * 11/1969 Weaver ................. B29C 48/766
159/6.3
(Continued)

FOREIGN PATENT DOCUMENTS

| CN | 1159959 A | 9/1997 |
|---|---|---|
| CN | 205182213 U | 4/2016 |

(Continued)

OTHER PUBLICATIONS

Principles of food engineering.
(Continued)

*Primary Examiner* — Jonathan Miller
(74) *Attorney, Agent, or Firm* — Volpe Koenig

(57) ABSTRACT

The present invention relates to the field of devolatilization, and discloses a polylactic acid devolatilization evaporator, which comprises: a container comprising a cylinder; an agitating shaft coaxial with the cylinder; an agitating belt connected to the agitating shaft and arranged in a spiral shape around the central axis of the cylinder, comprising an outer belt surface facing the inner circumferential surface of the cylinder and spaced apart from the inner circumferential surface of the cylinder. With the above technical scheme, the agitating belt makes the materials distributed more uniformly on the inner circumferential surface of the cylinder
(Continued)

and form a thin layer in uniform thickness, thereby avoids agglomeration of the materials, facilitates uniform heating of the materials, avoids deterioration (e.g., darkened color) of the materials owing to non-uniform heating of the materials and excessive retention time in a high-temperature environment, and improves product quality.

10 Claims, 2 Drawing Sheets

(51) Int. Cl.
*B01D 1/00* (2006.01)
*C08G 63/08* (2006.01)

(56) References Cited

U.S. PATENT DOCUMENTS

| | | | | |
|---|---|---|---|---|
| 3,797,550 | A | * | 3/1974 | Latinen ............... B29C 48/387 159/2.2 |
| 3,812,897 | A | * | 5/1974 | Latinen ............... B29C 48/766 159/49 |
| 5,185,060 | A | * | 2/1993 | Yamasaki ............ B01D 1/225 159/13.1 |
| 6,149,295 | A | * | 11/2000 | Volkmer ............... B01F 7/16 366/142 |
| 7,132,531 | B1 | * | 11/2006 | Wellings ............... B01F 7/242 536/25.3 |
| 2010/0160597 | A1 | * | 6/2010 | Kurihara ............... B01J 19/20 528/354 |

FOREIGN PATENT DOCUMENTS

| | | |
|---|---|---|
| CN | 208161595 U | 11/2018 |
| CN | 209957681 U | 1/2020 |
| EP | 1568728 A2 | 8/2005 |
| WO | 9810859 A1 | 3/1998 |

OTHER PUBLICATIONS

U.S. Organic Chemical Industry Pollutant Emission Estimation Agreement.
Principles of Food Engineering, edited by Gao Fucheng, China Light Industry Press, p. 389-390, Publication Date Dec. 31, 1998.
U.S. Organic Chemical Industry Pollutant Emission Estimation Agreement edited by Min Jian, p. 54, Publication Date May 31, 2017.

* cited by examiner

POLYLACTIC ACID DEVOLATILIZATION EVAPORATOR

PRIORITY CLAIM & CROSS REFERENCE

This application claims priority to Chinese Application No. 202010358359.1, filed on Apr. 29, 2020, entitled "Polylactic Acid Devolatilization Evaporator", which is specifically and entirely incorporated by reference.

FIELD OF INVENTION

The present invention relates to the field of devolatilization, in particular to a polylactic acid devolatilization evaporator.

BACKGROUND

At present, environmental pollution and resource shortage have posed great threats to the human society. It is an irresistible trend to develop renewable resources and biodegradable polymer materials to replace petroleum-based plastic products. The research on synthesis and application of polylactic acid (PLA) is the most active among the research and development activities.

Polylactic acid is a chemically synthesized green polymer material that is fully biodegradable. The development and utilization of polylactic acid can not only solve the environmental pollution problem, but also open up inexhaustible raw material resources for the plastic industry mainly based on petroleum resources. Therefore, the development of polylactic acid materials is of great significance in terms of environmental protection and resource development.

Among numerous polylactic acid synthesis methods, the lactide ring-opening polymerization method is an effective method to obtain polylactic acid materials with high molecular weight and high strength, and has broad application prospects. The lactide ring-opening polymerization process and the subsequent devolatilization process have become an important research subject in the domain of polylactic acid synthesis. On one hand, the focus of research is set to improvement of the polymerization process, aiming at further improve the molecular weight of the polymer to meet the demand for polylactic acid materials in various application; on the other hand, the focus of research is set to improvement of the subsequent devolatilization process in the late stage of the reaction, aiming at removing volatile substances with low molecular weight from the polymerization product that has high viscosity, so as to improve the purity of the polymer and thereby improve the moldability and thermostability of the polylactic acid materials.

In continuous polymerization methods that use lactide as the raw material to produce polylactic acid, the devolatilization method and equipment is a key link. Owing to the fact of the high viscosity of the system and high boiling point of the lactide monomer, devolatilization is always a challenge in the development of polylactic acid production process and techniques. The devolatilization process utilizes the decrease of equilibrium concentration of volatilization at the gas-liquid interface to drive the volatile components in the liquid phase to transfer to the gas phase quickly. However, the volatile components deep in the liquid have to reach to the interface through diffusion before they can exit from the liquid phase and migrate into the gas phase. Therefore, the transfer rate of the volatile components is a controlling factor for the devolatilization rate. At a constant temperature, there are three ways to improve the transfer rate of the volatile components: the first way is to make the liquid membrane thinner to shorten the diffusion distance; the second way is to increase the turbulent intensity of the liquid, so that the gas-liquid interface is refreshed continuously; the third way is to make the volatile components easier to vaporize and separate from the liquid phase.

In some existing polylactic acid devolatilization apparatuses, the devolatilization is not enough and the materials are yellowish after the devolatilization, because the materials to be devolatilized are not heated uniformly in the devolatilization process; in other existing polylactic acid devolatilization apparatuses, the devolatilization efficiency is low and the volatile content in the materials can't meet the specification unless the materials are treated for a long time in the high-temperature environment, because the volatile components can't escape quickly from the liquid phase after they are heated and gasified in the devolatilization process. Consequently, the efficiency of the devolatilization apparatus is poor, and the quality of the obtained final polylactic acid product is degraded.

SUMMARY

The object of the present invention is to provide a polylactic acid devolatilization evaporator to solve the problems that the materials are not heated uniformly during devolatilization and the volatile components in the materials can't escape from the polylactic acid quickly after they are heated and gasified.

To attain the above object, the present invention provides a polylactic acid devolatilization evaporator, which comprises:

a container comprising a circular pipe-shaped cylinder that extends vertically;

an agitating shaft at least partially arranged in the cylinder and coaxial with the cylinder;

an agitating belt connected to the agitating shaft and arranged in a spiral shape around a central axis of the cylinder, comprising an outer belt surface facing a inner circumferential surface of the cylinder and spaced apart from the inner circumferential surface of the cylinder.

Optionally, the spacing between the outer belt surface and the inner circumferential surface is 2 mm-30 mm.

Optionally, the agitating belt is radially spaced apart from the agitating shaft, and is connected to the agitating shaft via a connecting rod.

Optionally, the polylactic acid devolatilization evaporator comprises a supporting frame arranged at the bottom of the container, and the bottom end of the agitating shaft is rotatably supported on the supporting frame.

Optionally, the polylactic acid devolatilization evaporator comprises a plurality of supporting rods circumferentially spaced around the central axis of the cylinder, and an upper connecting base and a lower connecting base that are connected to the two ends of the supporting rods, wherein the upper connecting base is connected to the agitating shaft, and the plurality of supporting rods are snugly connected to the radial inner surface of the agitating belt.

Optionally, the polylactic acid devolatilization evaporator comprises a feed pipe passing through the cylinder and a distributor connected to the feed pipe, wherein the distributor comprises an annular pipe extending circumferentially around the central axis of the cylinder, and material distribution ports are arranged on the annular pipe; and the distributor is located at the top side of the agitating belt, the material distribution ports face the inner circumferential surface of the cylinder, and the orientation of the material distribution ports is inclined downward.

Optionally, the polylactic acid devolatilization evaporator comprises a jacket wrapped outside the cylinder, a sealed cavity is formed between the jacket and the cylinder, and a vapor condensate outlet pipe and a vapor inlet pipe that are in communication with the sealed cavity are arranged on the jacket; or the polylactic acid devolatilization evaporator comprises a heating spiral pipe that surrounds the cylinder and is connected with a liquid heating medium outlet pipe and a liquid heating medium inlet pipe.

Optionally, the container comprises a sealing cover connected to the top end of the cylinder and a stuffing box arranged on the sealing cover, wherein the agitating shaft rotatably passes through the sealing cover and the stuffing box, a packing material is provided between the agitating shaft and the stuffing box, and a sealing gas injection pipe is formed on the stuffing box.

Optionally, a discharge pipe that can be connected to a vacuum apparatus is provided at the top part of the cylinder, a conical cylinder is connected to the bottom end of the cylinder, a discharge port is formed in the bottom end of the conical cylinder, and an inert gas injection pipe is connected to the side wall of the conical cylinder.

With the technical scheme provided by the present invention, the materials entering into the devolatilization apparatus can be uniformly distributed to the inner surface of the cylinder at the upper part of the devolatilization evaporator for heating, so that the volatile components in the materials are gasified and enter into a gas phase space inside the cylinder. As the small-molecule volatile components in the materials are evaporated continuously, the viscosity of the materials is gradually increased in the process of downward flowing of the materials along the side wall of the cylinder. After the content of the volatile components in the materials is reduced to a certain degree, the materials can flow downward along the side wall anymore merely by their gravity. In the present invention, a spiral agitating belt is arranged around the agitating shaft of the evaporator near the side wall of the cylinder, the agitating belt is driven by the agitating shaft to rotate in the evaporator, so as to apply inclined downward scraping force on the materials adhering to the inner wall of the cylinder, thereby the viscous pasty materials from which the volatile constituents have been removed partially can continue moving downward spirally along the inner wall of the cylinder. In that way, the materials are prevented from sticking to the inner wall of the cylinder owing to excessively high viscosity or accumulating into lumps in a local area of the inner wall of the cylinder and then directly falling to the bottom of the cylinder under the action of gravity; thus the materials can be heated uniformly in the entire devolatilization process, and the retention time of the materials in the devolatilization evaporator in the high-temperature environment is generally the same, which are helpful for improving the quality of the devolatilized polylactic acid product. In addition, in the devolatilization evaporator provided by the present invention, the volatile components to be removed can escape from the thin material layer on the side wall of the cylinder quickly after they are heated and gasified, and then can be discharged from the evaporator successfully through the gas material flow passage in the cylinder. Thus high devolatilization efficiency can be achieved.

| Reference Numbers: | |
| --- | --- |
| 1 | Feed pipe |
| 2 | Distributor |
| 3 | Cylinder |
| 4 | Jacket |
| 5 | Agitating shaft |
| 6 | Agitating belt |
| 7 | Vapor condensate outlet pipe |
| 8 | Discharge pipe |
| 9 | Conical cylinder |
| 10 | Discharge port |
| 11 | Inert gas injection pipe |
| 12 | Supporting frame |
| 13 | Sealing cover |
| 14 | Vapor inlet pipe |
| 15 | Material distribution port |
| 16 | Sealing gas injection pipe |
| 17 | Packing material |
| 18 | Stuffing box |
| 19 | Connecting rod |
| 20 | Supporting rod |
| 21 | Upper connecting base |
| 22 | Heating spiral pipe |
| 23 | Liquid heating medium outlet pipe |
| 24 | Liquid heating medium inlet pipe |
| 25 | Lower connecting base |
| 26 | Connecting base exhaust hole |
| 27 | Agitating shaft exhaust hole |

DETAILED DESCRIPTION

Hereunder some embodiments of the present invention will be detailed with reference to the accompanying drawings. It should be understood that the embodiments described herein are only provided to describe and explain the present invention rather than constitute any limitation to the present invention.

In the present invention, unless otherwise specified, the terms denoting the orientations, such as "top and bottom", usually refer to the positional relationship when the cylinder of the container is arranged in a vertical extension form.

The present invention provides a polylactic acid devolatilization evaporator, which comprises:

a container comprising a circular pipe-shaped cylinder 3 that extends vertically;

an agitating shaft 5 at least partially arranged in the cylinder 3 and coaxial with the cylinder 3;

an agitating belt 6 connected to the agitating shaft 5 and arranged in a spiral shape around the central axis of the cylinder 3, comprising an outer belt surface facing the inner circumferential surface of the cylinder 3 and spaced apart from the inner circumferential surface of the cylinder 3.

Figure 1:
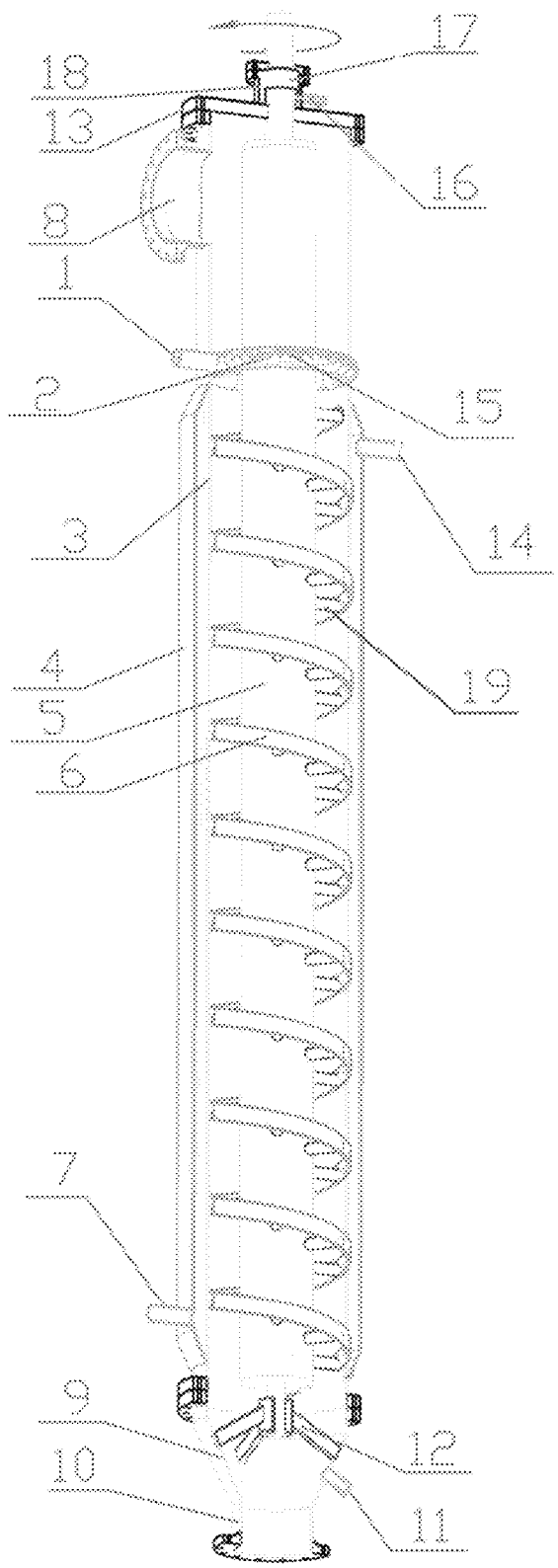
FIG. 1 is a schematic structural diagram of the polylactic acid devolatilization evaporator in an embodiment of the present invention.

The polylactic acid devolatilization evaporator in this scheme is applicable to a polylactic acid devolatilization process as well as a devolatilization process of polymers with similar properties. Wherein, the container accommodates the materials to be processed and the components in the evaporator, including a cylinder 3, which is formed in a circular pipe shape and can be arranged in a vertical extension form during the use, so that the materials can be agitated with a rotating agitator; the agitating shaft 5 is a transmission component, which can be connected to a power driver, such as an engine, motor, etc., so that the agitating shaft 5 is driven to rotate around the central axis of the cylinder 3; the agitating belt 6 is connected to the agitating shaft 5 to follow the rotation of the agitating shaft 5. In addition, the polylactic acid devolatilization evaporator comprises a feed pipe 1 passing through the cylinder 3 and a distributor 2 connected to the feed pipe 1, wherein the distributor 2 comprises an annular pipe extending circumferentially around the central axis of the cylinder 3, and material distribution ports 15 are arranged on the annular pipe. As shown in FIG. 1, the feed pipe 1 passes through the cylinder 3 and is connected to the distributor 2 in the cylinder 3. The distributor 2 is a circumferential annular pipe with material distribution ports 15 formed thereon. The feed pipe 1 can convey the materials into the distributor 2 and distribute the materials uniformly on the inner wall of the cylinder 3 through the material distribution ports 15. In other embodiments, a feed pipe extending into the cylinder 3 from a different part of the container (e.g., the sealing cover 13) may be used, and the distributor 2 may be used or omitted.

Furthermore, the distributor 2 is located at the top side of the agitating belt 6, the material distribution ports 15 face the inner circumferential surface of the cylinder 3, and the orientation of the material distribution ports 15 is preferably inclined downward. The material distribution ports 15 on the distributor 2 may be formed radially outward to face the inner circumferential surface of the cylinder 3, so that the materials can adhere to the inner circumferential surface of the cylinder 3 after they are jetted out, and can flow downward along the inner wall of the cylinder 3 under the action of gravity. A preferred scheme is that the orientation of the material distribution ports 15 is slightly inclined downward, so that the materials can get closer to the elevation of the agitating belt 6 below when they reach to the inner circumferential surface of the cylinder 3 after being jetted from the material distribution ports. The material distribution ports 15 may be holes or slits, etc.

Please see FIG. 1. The agitating belt 6 is formed in a spiral shape around the central axis of the cylinder 3, and has an outer belt surface facing the inner circumferential surface of the cylinder 3, and the outer belt surface is spaced apart from the inner circumferential surface of the cylinder 3. The pitch of the spiral agitating belt 6 may be 0.1-2 times, preferably 0.2-1.2 times, and optimally 0.3-0.8 times of the inner diameter of the cylinder 3; the width of the outer belt surface of the spiral agitating belt 6 may be 0.01-0.15 times, preferably 0.02-0.1 times, and optimally 0.03-0.08 times of the inner diameter of the cylinder 3. When the viscous materials adhere to the inner circumferential surface of the cylinder 3, the rotating agitating belt 3 can drive the materials to the space between the outer belt surface and the inner circumferential surface of the cylinder 3. In addition, according to the spiral direction of the agitating belt 6 (left-handed or right-handed), the agitating belt 6 can scrape the materials off the inner circumferential surface of the cylinder 3 downward, by adjusting the rotating direction of the agitating shaft 5 (in clockwise or counterclockwise direction), so that the materials are more uniformly coated on the inner circumferential surface of the cylinder 3. After the materials are heated on the side wall of the cylinder 3, the viscosity of the materials is gradually increased as the small-molecule volatile components in the materials are evaporated gradually. The scraping force applied by the agitating belt 6 on the materials can make the viscous pasty materials from which the volatile components have been removed partially move downward spirally along the inner wall of the cylinder. In that way, the materials can be prevented from sticking to the inner wall of the cylinder owing to excessive viscosity or accumulating in lumps in a local area of the inner wall of the cylinder and then directly falling to the bottom of the cylinder without being heated adequately, so as to attain the purpose of heating the materials uniformly in the devolatilization evaporator. Thus, color darkening and thermal decomposition of the materials as a result of excessive heating can be prevented, or insufficient devolatilization of a part of the materials owing to inadequate heating can be prevented, and the devolatilization effect is improved.

As for the rotating direction of the agitating belt 6, please see FIG. 1, in which the agitating belt 6 is in a left-handed spiral form and rotates in the clockwise direction. That is, the materials can be scraped axially downward by the lower edge at each position; in the case that the agitating belt is in a right-handed spiral form, it can rotate in the counterclockwise direction accordingly. The core structure of the agitating belt 6 is the outer belt surface. The agitating belt 6 is not limited to a belt structure, as long as it has an outer belt surface spaced apart from the inner circumferential surface of the cylinder 3. Of course, it is a preferred embodiment that the agitating belt 6 is formed in a belt shape.

Optionally, the spacing between the outer belt surface and the inner circumferential surface is 2 mm-30 mm. The spacing between the outer belt surface and the inner circumferential surface of the agitating belt 6 may be consistent at different positions, so that a uniform material layer can be formed on the inner circumferential surface of the cylinder 3. Specifically, the spacing may be 2 mm-30 mm, thus a material layer in 2 mm-30 mm thickness can be formed on the inner circumferential surface of the cylinder 3.

In the embodiment shown in FIG. 1, the agitating belt 6 is radially spaced apart from the agitating shaft 5, and is connected to the agitating shaft 5 via a connecting rod 19. As shown in FIG. 1, the agitating shaft 5 may extend from the top part to the bottom part of the cylinder 3, and the outer diameter of the agitating shaft 5 is smaller than the inner diameter of the spiral structure formed by the agitating belt 6; moreover, the agitating belt 6 is connected to the agitating shaft 5 via the connecting rod 19, so that a large space is formed between the agitating belt 6 and the agitating shaft 5, thus the gaseous fluid generated during the devolatilization of the materials can be discharged through the space. Of course, the agitating belt 6 and the agitating shaft 5 may be connected in other ways. For example, a spiral plate with holes may be arranged between the agitating belt 6 and the agitating shaft 5, the outer edge of the spiral plate may be welded to the spiral agitating belt 6, and the inner edge of the spiral plate may be welded to the agitating shaft 5, so that the agitating belt 6 and the agitating shaft 5 are connected into a rigid body, the agitating shaft can drive the agitating belt to rotate in the evaporator, and the volatile gas evaporated in the evaporator can ascend to the upper space of the evaporator through the holes in the spiral plate, and then is discharged through the discharge port 8.

Furthermore, the polylactic acid devolatilization evaporator comprises a supporting frame 12 arranged at the bottom of the container, and the bottom end of the agitating shaft 5 is rotatably supported on the supporting frame 12. As shown in FIG. 1, the supporting frame 12 is generally in the form of a tripod to support the bottom end of the agitating shaft 5 while allowing the agitating shaft 5 to rotate. The supporting frame 12 may be supported on the tapered inner circumferential surface of the conical cylinder 9. Of course, in other embodiments, the supporting frame 12 may be supported on the inner circumferential surface of the cylinder 5.

As shown in FIG. 1, the polylactic acid devolatilization evaporator comprises a jacket 4 wrapped outside the cylinder 3, and a sealed cavity is formed between the jacket 4 and the cylinder 3. The jacket 4 is provided with a vapor inlet pipe 14 at its top end and a vapor condensate outlet pipe 7 at its bottom end. The vapor introduced into the jacket 4 transfers heat to the viscous materials creeping downward along the inner wall of the cylinder body through the cylinder 3, so that the components with a relatively low boiling point in the materials, such as a solvent for diluting the catalyst, the unpolymerized lactide monomer, or the micromolecular acid or ester substances produced by subsidiary reactions such as hydrolysis in the polymerization process are gasified into a gaseous state and volatilized from the materials. Of course, heat transfer oil or hot water may also be used as the heating medium. However, in the case that a liquid heating medium is used, the heating medium shall be introduced into the jacket 4 from the bottom of the jacket 4 and discharged from the top of the jacket 4. In order to reduce the heat loss resulted from the system's heat dissipation to the environment and prevent scalding accidents, usually it is necessary to arrange a thermal insulation layer in thickness not smaller 5 cm outside the jacket 4.

In addition, the container comprises a sealing cover 13 connected to the top end of the cylinder 3 and a stuffing box 18 arranged on the sealing cover, wherein the agitating shaft 5 rotatably passes through the sealing cover 13 and the stuffing box 18, a packing material 17 is provided between the agitating shaft 5 and the stuffing box 18, and preferably a sealing gas injection pipe 16 is formed on the stuffing box 18. As shown in FIG. 1, the sealing cover 13 is sealed at the top end of the cylinder 3, and the sealing cover 13 is integrally connected with the stuffing box 18, which is formed in a substantially tubular shape. The agitating shaft 5 passes through the sealing cover 13 and the stuffing box 18, and surrounds the agitating shaft 5 through the packing material 17, thereby improving the sealing performance. In addition, preferably a sealing gas injection pipe 16 is provided on a side of the stuffing box 18, and a gas can be injected into the clearance between the stuffing box 18 and the agitating shaft 5 through the sealing gas injection pipe 16, so that slight positive pressure is maintained in the clearance to prevent external gasses or foreign substances from entering into the space between the stuffing box 18 and the agitating shaft 5. The injected gas may be an inert gas, such as nitrogen, argon, etc.

Moreover, a discharge pipe 8 that can be connected to a vacuum apparatus is provided at the top part of the cylinder 3, a conical cylinder 9 is connected to the bottom end of the cylinder 3, a discharge port 10 is formed in the bottom end of the conical cylinder 9, and an inert gas injection pipe 11 is connected to the side wall of the conical cylinder 9. The inner diameter of the conical cylinder 9 is continuously reduced downward, and the materials can be discharged through the bottom discharge port 10 after devolatilization; a shielding gas can be injected into the cylinder 3 through the inert gas injection pipe 11 to expel the air inside the cylinder 3, so as to avoid chemical reaction between the materials in the cylinder 3 and air; the discharge pipe 8 may be connected to vacuum equipment to vacuumize the cylinder 3 and reduce the pressure therein, so as to facilitate devolatilization and evaporation of the materials. In addition, by injecting a gas through the inert gas injection pipe 11, the partial pressure of the gaseous substances generated during the devolatilization can be reduced, so as to promote the devolatilization.

Figure 2:
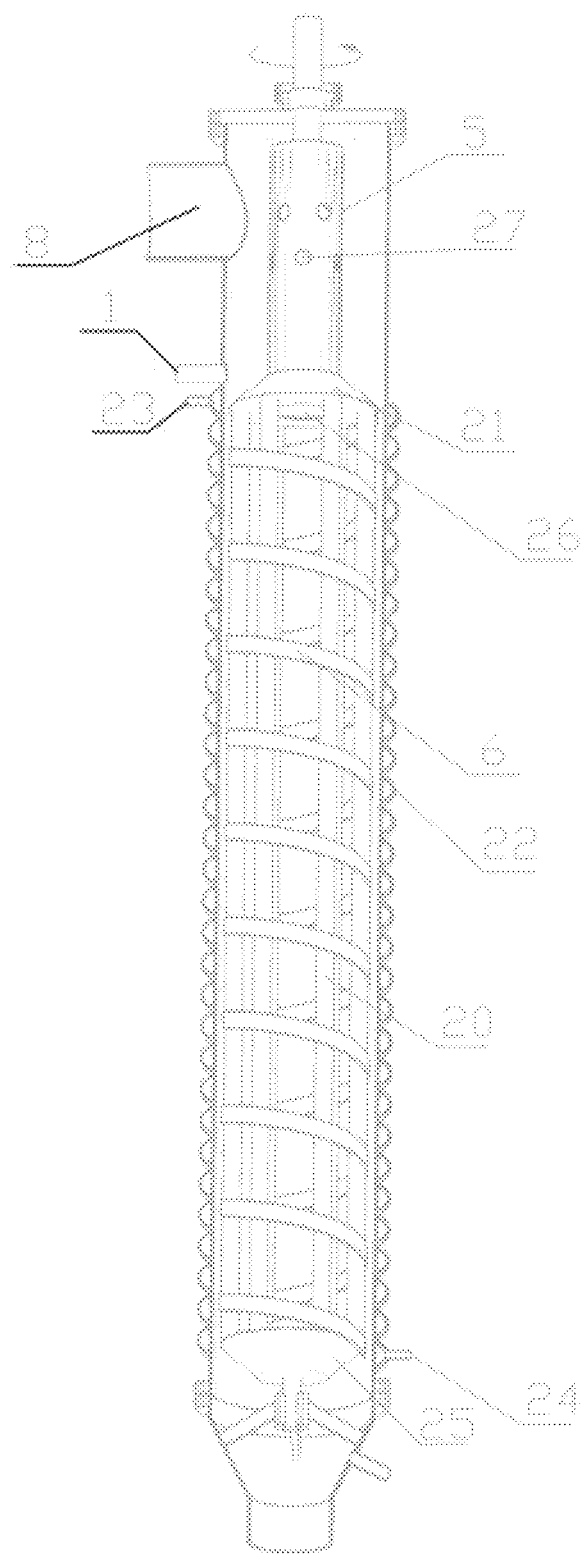
FIG. 2 is a schematic structural diagram of the polylactic acid devolatilization evaporator in another embodiment of the present invention.

According to another embodiment of the scheme, as shown in FIG. 2, the polylactic acid devolatilization evaporator comprises a plurality of supporting rods 20 circumferentially spaced around the central axis of the cylinder 3, and an upper connecting base 21 and a lower connecting base 25 that are connected to the two ends of the supporting rods 20, wherein the upper connecting base 21 is connected to the agitating shaft 5, the agitating shaft 5 is a hollow tubular structure, with 4-16 exhaust holes 27 arranged in the side wall of the tubular agitating shaft 5 in the circumferential direction, and the total area of those holes is approximately equivalent to the cross-sectional area of the tubular agitating shaft. An exhaust hole 26 is arranged at the center of the upper connecting base 21, and the cross-sectional area of the hole is also approximately equivalent to the cross-sectional area of the tubular agitating shaft. The gaseous volatile components evaporated after the materials are heated in the evaporator can enter into the inner cavity of the agitating shaft 5 through the exhaust hole of the upper connecting base 25, then are discharged into the upper space of the evaporator through the exhaust holes in the side wall of the agitating shaft 5, and finally are discharged from the evaporator through the discharge port 8. The plurality of supporting rods are snugly connected to the radially inner surface of the agitating belt 6. The clearance between the radially outer surface of the agitating belt 6 and the inner surface of the cylinder 3 is 2-30 mm. As shown in FIG. 2, the plurality of supporting rods 20 and the two connecting bases 21 constitute a supporting structure for the agitating belt 6, and the supporting rods 20 are attached to the radial inner surface of the agitating belt 6, thus forming a passage for gas discharge in the internal space enclosed by the agitating belt 6. The upper connecting base 21 is connected to the agitating shaft 5 to drive the supporting rod 20 and the agitating belt 6 to rotate via the agitating shaft 5. The width of the clearance between the outer edge of the bottom end of the upper connecting base 21 and the inner wall of the cylinder 3 is 1-25 mm. The materials introduced into the evaporator through the feed pipe 1 flow downward along the inner wall of the cylinder 3 through the clearance between the upper connecting base 21 and the inner wall of the cylinder 3. In the case that no distributor is provided at the outlet of the feed pipe 1 but the feed liquid is distributed by means of the clearance between the upper connecting base 21 and the inner wall of the cylinder 3 instead, advantageously the feed pipe 1 communicates with the cylinder 3 in the tangential direction of the cylinder 3.

In the embodiment shown in FIG. 2, a heating spiral pipe 22 is welded on the outer wall of the cylinder 3, and heat transfer oil or high-temperature hot water enters into the heating spiral pipe 22 through a heating medium inlet pipe 24 and then flows out through a liquid heating medium outlet pipe 23. In order to reduce the heat loss resulted from the system's heat dissipation to the environment and prevent scalding accidents, usually it is necessary to arrange a thermal insulation layer in thickness not smaller 5 cm outside the spiral pipe.

When the evaporator provided by the present invention is used for polylactic acid devolatilization, the inlet temperature range of the heating medium introduced into the jacket 4 or the heating spiral pipe 22 is 180-240° C., preferably 190-230° C., and optimally 200-225° C.; the range of pressure in the evaporator is 0.1 kPa-20 kPa, preferably 1 kPa-10 kPa, and optimally 2 kPa-8 kPa; the rotating speed of the agitating shaft ranges is 5-120 rpm, preferably 10-60 rpm, and optimally 15-45 rpm.

Embodiment 1

Polylactic acid/lactide materials obtained by melt polymerization of lactide at 94.6% conversion ratio is fed into the devolatilization apparatus shown in FIG. 1 at 10 kg/h flow rate for removing the residual monomer.

In this embodiment, the clearance between the outer edge of the agitating belt 6 and the inner wall of the cylinder 3 is 25 mm, the pitch of the agitating belt 6 is 0.5 times of the inner diameter of the cylinder 3, the width of the agitating belt 6 is 0.075 times of the inner diameter of the cylinder 3, the rotating speed of the agitating shaft 5 is 15 rpm, the temperature of the vapor introduced into the jacket 4 is 200° C., and the absolute pressure in the evaporator is 8 KPa.

The measured monomer content in the polylactic acid chips at the outlet of the film evaporator is 0.16 wt %.

Embodiment 2

Polylactic acid/lactide materials obtained by melt polymerization of lactide at 95.8% conversion ratio is fed into the devolatilization apparatus shown in FIG. 2 at 10 kg/h flow rate for removing the residual monomer.

In this embodiment, the clearance between the outer edge of the agitating belt 6 and the inner wall of the cylinder 3 is 5 mm, the pitch of the agitating belt 6 is 0.75 times of the inner diameter of the cylinder 3, the width of the agitating belt 6 is 0.06 times of the inner diameter of the cylinder 3, the rotating speed of the agitating shaft 5 is 45 rpm, the temperature of the heat transfer oil introduced into the jacket 4 is 220° C., and the absolute pressure in the evaporator is 2 KPa.

The measured monomer content in the polylactic acid chips at the outlet of the evaporator is 0.09 wt %.

Comparative Example 1

Polylactic acid/lactide materials obtained by melt polymerization of lactide at 95.2% conversion ratio is fed into the devolatilization apparatus provided by the Chinese Utility Model Patent No. CN 204932896 U at 10 kg/h flow rate for removing the residual monomer.

In the comparative example, the spacing between the inner wall of the cylinder and the scraper outside the agitating shaft is 5 mm. Under the operating conditions that the rotation speed of the agitating shaft is 30 rpm, the temperature of the heat transfer oil introduced into the jacket is 200° C., and the absolute pressure in the evaporator is 5 KPa, the measured monomer content in the polylactic acid chips at the discharge port of the film evaporator is 0.32 wt %; when the rotating speed of the agitating shaft is increased to 45 rpm, the temperature of the heat-conducting oil introduced into the jacket 4 is increased to 220° C., and the absolute pressure in the evaporator is reduced to 2 KPa, the system cannot operate normally because the polylactic acid material severely adheres to the scraper of the evaporator.

From the comparison between the examples 1-2 and the comparative example 1, it is seen that the monomer content in the polylactic acid can be reduced to below 0.2 wt % or even below 0.1 wt % with the devolatilization apparatus provided by the present invention, and the technical effect is obviously better than that achieved in the prior art.

While the present invention is described above in detail in some preferred embodiments with reference to the accompanying drawings, the present invention is not limited to those embodiments. Various simple variations may be made to the technical scheme in the present invention, including combinations of the specific technical features in any appropriate form, within the scope of the technical ideal of the present invention. To avoid unnecessary repetition, the possible combinations are not described specifically in the present invention. However, such simple variations and combinations shall also be deemed as having been disclosed and falling in the scope of protection of the present invention.

What is claimed is:

1. A polylactic acid devolatilization evaporator, comprising:
   a container comprising a circular pipe-shaped cylinder that extends vertically;
   an agitating shaft at least partially arranged in the cylinder and coaxial with the cylinder;
   an agitating belt connected to the agitating shaft and arranged in a spiral shape around a central axis of the cylinder, comprising an outer belt surface facing an inner circumferential surface of the cylinder and spaced apart from the inner circumferential surface of the cylinder.

2. The polylactic acid devolatilization evaporator according to claim 1, wherein the spacing between the outer belt surface and the inner circumferential surface is 2 mm-30 mm.

3. The polylactic acid devolatilization evaporator according to claim 1, wherein the agitating belt is radially spaced apart from the agitating shaft, and is connected to the agitating shaft via a connecting rod.

4. The polylactic acid devolatilization evaporator according to claim 3, comprising a supporting frame arranged at the bottom of the container, wherein the bottom end of the agitating shaft is rotatably supported on the supporting frame.

5. The polylactic acid devolatilization evaporator according to claim 1, comprising a plurality of supporting rods circumferentially spaced around the central axis of the cylinder, an upper connecting base and a lower connecting base that are connected to the two ends of the supporting rods, wherein the upper connecting base is connected to the agitating shaft, and the plurality of supporting rods are snugly connected to a radial inner surface of the agitating belt.

6. The polylactic acid devolatilization evaporator according to claim 5, wherein an exhaust passage is arranged in the upper connecting base and the agitating shaft, a connecting base exhaust hole in communication with the exhaust passage is arranged in the bottom of the upper connecting base, and an agitating shaft exhaust hole in communication with the exhaust passage is arranged in the side wall of the agitating shaft.

7. The polylactic acid devolatilization evaporator according to claim 1, comprising a feed pipe passing through the cylinder and a distributor connected to the feed pipe, wherein the distributor comprises an annular pipe extending circumferentially around the central axis of the cylinder, and material distribution ports are arranged on the annular pipe; and
   the distributor is located at the top side of the agitating belt, the material distribution ports face the inner circumferential surface of the cylinder, and the orientation of the material distribution ports is inclined downward.

8. The polylactic acid devolatilization evaporator according to claim 1, comprising a jacket wrapped outside the cylinder, wherein a sealed cavity is formed between the jacket and the cylinder, and a vapor condensate outlet pipe and vapor inlet pipe that are in communication with the sealed cavity are arranged on the jacket; or
   comprising a heating spiral pipe that surrounds the cylinder and is connected with a liquid heating medium outlet pipe and a liquid heating medium inlet pipe.

9. The polylactic acid devolatilization evaporator according to claim 1, wherein the container comprises a sealing cover connected to the top end of the cylinder and a stuffing box arranged on the sealing cover, wherein the agitating shaft rotatably passes through the sealing cover and the stuffing box, a packing material is provided between the agitating shaft and the stuffing box, and a sealing gas injection pipe is formed on the stuffing box.

10. The polylactic acid devolatilization evaporator according to claim 1, wherein a discharge pipe that can be connected to a vacuum apparatus is provided at the top part of the cylinder, a conical cylinder is connected to the bottom end of the cylinder, a discharge port is formed in the bottom end of the conical cylinder, and an inert gas injection pipe is connected to a side wall of the conical cylinder.

\* \* \* \* \*